US012227895B2

(12) United States Patent
Wheless et al.

(10) Patent No.: US 12,227,895 B2
(45) Date of Patent: Feb. 18, 2025

(54) ODOR REDUCTION AND BACTERIAL CONTROL ON A TEXTILE MATERIAL (71) Applicant: Microban Products Company, Huntersville, NC (US)

(72) Inventors: Kenneth Clay Wheless, Indian Trail, NC (US); Gina Parise Sloan, Statesville, NC (US); Burke Irving Nelson, Mooresville, NC (US)

(73) Assignee: Microban Products Company, Huntersville, NC (US)

(*) Notice: Subject to any disclaimer, the term of this patent is extended or adjusted under 35 U.S.C. 154(b) by 64 days.

(21) Appl. No.: 17/128,849

(22) Filed: Dec. 21, 2020

(65) Prior Publication Data

US 2021/0198840 A1 Jul. 1, 2021

Related U.S. Application Data (60) Provisional application No. 62/955,161, filed on Dec. 30, 2019, provisional application No. 62/955,155, filed on Dec. 30, 2019.

(51) Int. Cl.
| | |
|---|---|
| *D06M 13/184* | (2006.01) |
| *A01N 25/10* | (2006.01) |
| *A01N 37/04* | (2006.01) |
| *A01N 37/10* | (2006.01) |
| *C08J 3/22* | (2006.01) |

(Continued)

(52) U.S. Cl.
CPC ......... *D06M 13/1845* (2013.01); *A01N 25/10* (2013.01); *A01N 37/04* (2013.01); *A01N 37/10* (2013.01); *C08J 3/226* (2013.01); *C08K 5/092* (2013.01); *C09D 7/63* (2018.01); *C09D 127/08* (2013.01); *D06M 11/36* (2013.01); *D06M 11/76* (2013.01); *D06M 16/00* (2013.01); *C08J 2327/08* (2013.01); *D06M 2200/00* (2013.01); *D06M 2400/00* (2013.01)

(58) Field of Classification Search
None
See application file for complete search history.

(56) References Cited

U.S. PATENT DOCUMENTS

| | | | |
|---|---|---|---|
| 1,998,925 A | 4/1935 | Demant et al. | |
| 2004/0137202 A1 | 7/2004 | Hamilton et al. | |

(Continued)

FOREIGN PATENT DOCUMENTS

| | | |
|---|---|---|
| CN | 104798777 A | 7/2015 |
| CN | 102946725 A | 1/2016 |

(Continued)

OTHER PUBLICATIONS

Machine translation of WO2008119636 (Year: 2008).*

(Continued)

*Primary Examiner* — Shawn McKinnon
(74) *Attorney, Agent, or Firm* — Shumaker, Loop & Kendrick, LLP (57) ABSTRACT A composition for odor reduction and bacterial control on a textile material is provided. The composition has a GRAS antimicrobial/preservative additive. The composition may contain an essential oil. The GRAS antimicrobial/preservative additive can be a minimum risk pesticide. The composition may have a carrier. A method of using the composition and an article treated with the composition are also provided.

13 Claims, 4 Drawing Sheets (51) Int. Cl.
*C08K 5/092* (2006.01)
*C09D 7/63* (2018.01)
*C09D 127/08* (2006.01)
*D06M 11/36* (2006.01)
*D06M 11/76* (2006.01)
*D06M 16/00* (2006.01)

(56) References Cited

U.S. PATENT DOCUMENTS

| | | | |
|---|---|---|---|
| 2006/0123558 | A1 | 6/2006 | Li et al. |
| 2006/0165623 | A1* | 7/2006 | Workman ............ A61K 8/9733 424/70.13 |
| 2010/0120311 | A1* | 5/2010 | Bender ............... D06M 13/355 424/618 |
| 2012/0100095 | A1 | 4/2012 | Nelson |
| 2013/0064876 | A1* | 3/2013 | Viladot Petit .......... B01J 13/206 424/443 |
| 2013/0139327 | A1 | 6/2013 | Henkel |
| 2014/0080945 | A1 | 3/2014 | Andermann, Jr. et al. |
| 2015/0173355 | A1* | 6/2015 | Konate ................. A01N 35/06 514/690 |
| 2016/0143275 | A1 | 5/2016 | Lan et al. |
| 2017/0336372 | A1 | 11/2017 | Kang et al. |

FOREIGN PATENT DOCUMENTS

| | | | |
|---|---|---|---|
| CN | 106847713 | A | 6/2017 |
| CN | 107231806 | A | 10/2017 |
| EP | 3275946 | * | 1/2018 |
| JP | S6023309 | A | 2/1985 |
| JP | H04163372 | A | 6/1992 |
| JP | 2005535711 | A | 11/2005 |
| JP | 2006214037 | A | 8/2006 |
| JP | 2010184987 | A | 8/2010 |
| JP | 2013538944 | A | 10/2013 |
| JP | 5908471 | B2 | 4/2016 |
| JP | 201999682 | A | 6/2019 |
| WO | 2004014416 | A1 | 2/2004 |
| WO | WO2008119636 | * | 10/2008 |
| WO | 2016086014 | A1 | 6/2016 |
| WO | WO2019195616 | * | 10/2019 |

OTHER PUBLICATIONS

International Search Report and Written Opinion, PCT/US2020/66573, dated Mar. 16, 2021, 10 pages.
Chinese Office Action (CNOA) issued for 202080090899 dated Aug. 17, 2023 (32 pages).
First Office Action (issued Sep. 21, 2023) for corresponding Chinese Application No. 202080090899.4 (20 Pages).
Partial Search Report Issued for the Corresponding European Application (EP App No. 20908540.6); Issued Dec. 4, 2023; Provided Herein Per MPEP 609.04(A)III. (16 Pages).
Chinese Office Action issued in corresponding Chinese Patent Application No. 202080090899.4; issued on Mar. 13, 2024; (14 pages).
Office Action issued for Japanese App No. 2022-540585; issued on Mar. 12, 2024 (4 Pages).
Decision on Rejection issued in corresponding Japanese Application No. 2022-540585 (provided herein per MPEP 609.04(a)III.).
Office Action issued for Taiwan Patent App No. 109146678 on Aug. 20, 2024 (5 Pages).
Office Action issued for Taiwan Patent App No. 109146677 on Aug. 20, 2024 (5 Pages).
Suet-Yen Sung; "Antimicrobial Agents for Food Packaging Applications" Trends in Food Science & Technology; Published: Dec. 31, 2013 (14 Pages) Cited in CN 109146678 and 109146677; provided herein per MPEP 609.04(a)III).

* cited by examiner

ODOR REDUCTION AND BACTERIAL CONTROL ON A TEXTILE MATERIAL

CROSS-REFERENCE TO RELATED APPLICATIONS

This application claims priority from U.S. Provisional Patent Application No. 62/955,161, filed on Dec. 30, 2019, and U.S. Provisional Patent Application No. 62/955,155, filed on Dec. 30, 2019, in the United States Patent and Trademark Office. The disclosures of which are incorporated herein by reference in their entireties.

FIELD OF THE INVENTION

The invention relates to a composition and method for odor reduction and bacterial control on a textile material, more particularly to a composition and method for odor reduction and bacterial control on a textile material using a Generally-Recognized-as-Safe (GRAS) antimicrobial/preservative additive or component, such as a food preservative.

BACKGROUND OF THE INVENTION

Current bacterial control on textile garments relies heavily on the use of metal-containing actives such as silver or zinc. These chemistries have reduced durability to laundering, can result in fabric discoloration, and are not easily incorporated into most textile manufacturing processes. Additionally, the presence of "heavy metals" in process effluent water in textile mills has been an issue of concern for regulators and policy makers.

Alternatively, the use of organic molecules, such as quaternary ammonium silanes, phenolics, and azoles, can be leveraged to treat textile surfaces. These chemistries require extensive formulary efforts to reduce hydrophobicity, increase durability, and are only applicable to textile padding applications.

To date the only chemistry that can be applied in the majority of textile manufacturing processes without technical issues is zinc pyrithione. However, this unique chemistry is being reviewed by regulatory authorities. These reviews may ultimately result in an inability to utilize zinc pyrithione to reduce odor and stain causing bacteria on textile surfaces.

Thus, present technologies are not able to be exhausted and padded, have adverse impacts on the textile properties, and are being classified as possible toxins. As such it is imperative that new solutions to control odor and bacteria on textile surfaces be garnered.

Thus, there is a need for alternative chemistries for microbial and odor control efficacy on textiles that are effective, safe, environmentally-friendly, easy to apply with current mill technology, and affordable to use.

SUMMARY OF THE INVENTION

The present invention relates to a composition for odor reduction and bacterial control on a textile material using a Generally-Recognized-as-Safe (GRAS) additive or component having an antimicrobial or preservative property. Examples of GRAS additives include, but are not limited to, a minimum risk pesticide, a food preservative, among others.

In an embodiment of the present invention, the composition comprises a component selected from the group consisting of a GRAS additive or component having an antimicrobial or preservative property. The composition may further comprise a component selected from the group consisting of an essential oil, a carrier, and a combination thereof.

In an embodiment of the present invention, the composition is in a form of a concentrate.

In an embodiment of the present invention, the composition further comprises an odor mitigation compound selected from the group consisting of a metal oxide, activated carbon, sodium carbonate, calcium carbonate, zinc rincoleate, and a combination thereof.

In an embodiment of the present invention, the GRAS antimicrobial additive/preservative is an organic acid.

In an embodiment of the present invention, the organic acid has a total concentration of 5% to 60% active by weight of the composition.

In an embodiment of the present invention, a method for odor reduction and bacterial control on a textile material comprises applying a composition comprised of a GRAS antimicrobial additive/preservative and a carrier.

In an embodiment of the invention, an article such as a textile material is treated with the composition of the present invention is provided.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The present invention relates to a composition and method for imparting bacterial and odor control on a textile material using environmentally friendly ingredients while also not compromising the dye process of textile materials.

Although the invention contains active ingredients that could possibly alter some dye colors during the textile dying and treatment process, the invention also contains additional ingredients that simultaneously protect the dye molecules from alteration during the textile dying and treatment processes.

In an embodiment of the invention, a composition that is "Generally Recognized As Safe" (GRAS) for imparting odor reduction and bacterial control on a textile material is provided. The acronym "GRAS" is used by federal regulatory agencies to refer to substances that are considered to be "Generally Recognized As Safe" when used in accordance with good manufacturing practices. For example, such regulations include 21 CFR 182, 21 CFR 184, and 21 CFR 186.

Examples of GRAS components or compounds include, but are not limited to, food preservatives. As a category, food preservatives may be suitable for use in the composition of the present invention as they are classified as minimum risk pesticides while providing antimicrobial efficacy. However, any food preservative suitable for use in the present invention should be able to withstand a textile processing environment including temperatures of >150° C. and have water dispersibility, compatibility with acetic acid, and low skin toxicity profiles.

In an embodiment of the present invention, the antimicrobial additive is an organic acid. Examples of organic acids include, but are not limited to, benzoic acid, propionic acid, sorbic acid, citric acid, lactic acid, ascorbic acid, acetic acid, erythorbic acid, fumaric acid, malic acid, glycolic acid, derivatives thereof and a combination thereof. Preferred organic acids include, but are not limited to, benzoic acid, sorbic acid, citric acid, and a combination thereof.

Other examples of GRAS additives suitable for use in the present invention are sodium benzoate and potassium sorbate.

The composition of the present invention may comprise one or more additives. For example, an essential oil can be added in combination with benzoic acid, sorbic acid, or a combination thereof to have activity against fungal species.

Examples of essential oils include, but are not limited to, cedarwood oil, tea tree oil (*Melaleuca alternifolia*), eucalyptus oil (*Eucalyptus globulus* or *E. radiata*), clove oil (*Eugenia caryophyllata*), oregano oil (*Origanum vulgare*), thyme oil (*Thymus vulgaris*), geranium oil (*Pelargonium graveolens*), cinnamon bark oil (*Cinnamomum zeylanicum*), peppermint oil (*Mentha piperita*), lemongrass oil (*Cymbopogon flexuosus*), basil oil (*Ocimum basilicum*), lavender oil (*Lavandula angustifolia*), lemon oil (*Citrus limon*), rosemary oil (*Salvia rosmarinus*), bergamot oil (*Citrus bergamia*), perilla oil (*Perilla frutescens*), coriander oil (*Coriandrum sativum*), citron oil (*Citrus medica*), and a combination thereof. Preferred essential oils include, but are not limited to, cinnamon bark oil (*Cinnamomum zeylanicum*), lemongrass oil (*Cymbopogon flexuosus*), thyme oil (*Thymus vulgaris*), cedarwood oil, citronella, peppermint oil, rosemary oil, clove oil, and a combination thereof. Some essential oils, such as peppermint oil, cinnamon oil, have little to no antibacterial activity but have a unique impact on fungal species.

Additionally, it is desirable to control non-microbial related odors on textile surfaces. The organic acids (or combinations thereof) can provide the ability to neutralize alkaline based odors such as ammonia. Moreover, organic acids with aryl groups have the potential to sequester ring-based odorants, such as pyridine. To supplement these effects, an additional odor mitigation compound can be added to the combination of benzoic acid, sorbic acid, and/or essential oils for the removal of existing odors. The addition of an odor mitigation compound results in a unique blend that can provide antimicrobial and odor control benefits. Examples of odor mitigation compounds include, but are not limited to, metal oxides, activated carbon, sodium carbonate, calcium carbonate, and zinc rincoleate.

The addition of a metal oxide (for example, ZnO) to any of the chemistries results in a unique blend that can provide antimicrobial and odor control benefits. Ammonia, aldehyde-based odors such as nonanal and alkaline odors such as pyridine have been tested and determined to reduce odor levels (by GC measurement). This functionality will allow the active acids to control non-bacterial generated odor in addition to reducing bacterial odors by controlling bacterial populations.

In an embodiment of the invention, the composition of the present invention comprises a stable suspension of benzoic acid, sorbic acid, or a combination thereof at a total concentration of 5% to 60% active by weight of the composition, preferably 10% to 50% active by weight of the composition. Acids are present in the carrier which is water or could be in a glycol such as propylene glycol, di-propylene glycol, an organic solvent, or the utilization of surfactants that would dissolve the acid and allow the invention to be a solution rather than a dispersion. Yet another method of incorporating the antimicrobial is to formulate with the salt of the acid, such as sodium benzoate for benzoic acid, add the salt-based formula to the liquor and then add a separate acid to the exhaustion bath liquor to lower the pH of the bath to cause the benzoate salt to convert to benzoic acid. This would allow the concentrate to be formulated as an easily managed aqueous liquid due to the high solubility of the salt in water.

The composition of the present invention may optionally comprise an essential oil at a total concentration of 1% to 20% by weight of the composition and may optionally comprise a metal oxide at a total concentration of 1% to 20% by weight of the composition, preferably 5% to 10% by weight of the composition.

In an embodiment of the invention, a method of using the textile treatment composition is provided, preferably the GRAS textile treatment composition. The composition of the present invention may be applied to a textile material by any application method known to one skilled in the art in the textile industry. For example, two traditional textile approaches are exhaustion and padding.

Textile mills utilize liquid engineering processes, such as exhaustion or padding, to incorporate auxiliary chemistries and finishes such as antimicrobials. Because of the requirement for liquid components within the textile manufacturing process, an organic acid is in a liquid form (a stable solution or dispersion) or dispersed in water prior to its use by a consumer. Many organic acids are not readily miscible with water. It has been observed upon dispersing the organic acid in water that after a short time the acid settles to form a packed layer that is difficult to re-disperse in a user-friendly manner. Dispersing agents may be added to the textile composition or bath to deal with this issue. For example, a non-ionic dispersing agent may be used for this purpose. The dispersing agent aids in wetting the acid surfaces, creating distance between individual particles, and reduces the viscosity of a high load slurry. An example of another non-limiting dispersing agent is a dispersible inorganic polymer crystal that has the ability to work between the acid particles and offer a thixotropic property to the rheology of the concentrate. This additive ensures further the ease of re-dispersion of the acid particles upon consumer use.

Figure 4:
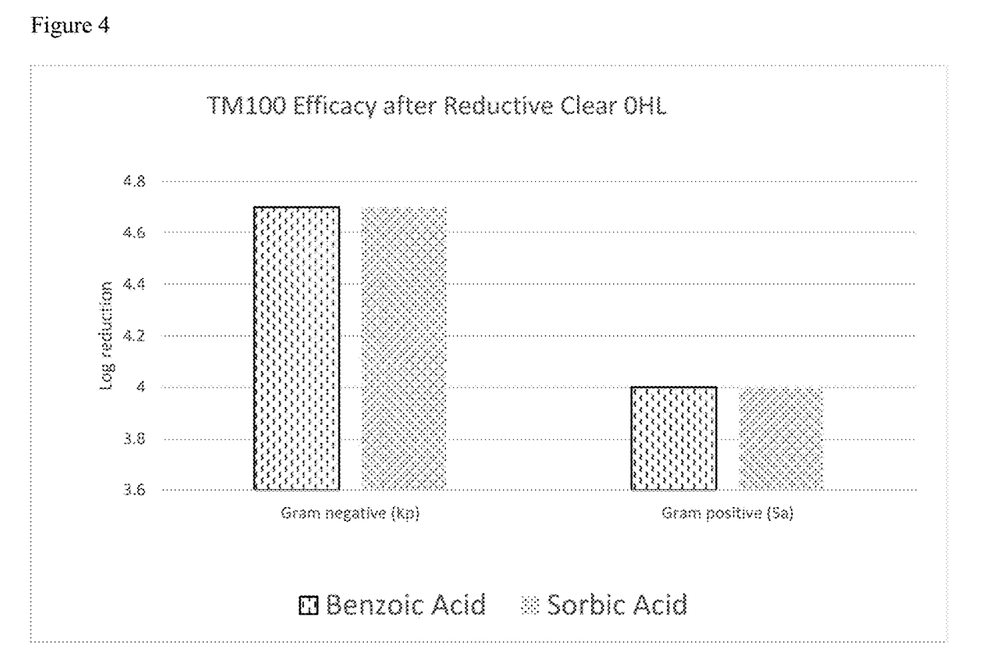
FIG. 4 is a graph depicting efficacy results using an AATCC TM100 after a reductive clear at zero home launderings (0 HL). Benzoic and sorbic acid were exhausted on to the polyester fabric and demonstrate efficacy after the reductive clear.

Interestingly, in an exhaustion dye process, benzoic acid and sorbic acid are introduced to the PET surface and inner amorphous regions along with the dyes by way of heat driven glass transitional physical changes that take place with the PET fibers at targeted operating temperatures. Disperse dyes are milled along with dispersing agents. These dispersing agents are essentially carbon chains terminated with dissociative acid functional groups. The dispersing agents, having undergone dissociation, carry the dye molecules into the PET fibers at the correct operation temperatures by way of micelle action. Once the micelle is within appropriate proximity to the PET structures, van der Waals forces take over and the dye molecules adhere to the inner amorphous regions of the PET fibers. The micelle surfactant molecules then attract to a different unbound dye molecule and the process starts over again. The organic acids, such as benzoic and sorbic acids, undergo dissociation, developing a negative charge at the hydroxyl oxygen, and therefore do not need to an additional dispersing agent. Therefore, the organic acids take on a polar nature and are attracted to the polar dispersing agents introduced with the dye. The organic acids become part of the micelles that carry the dyes and find that pathway into close proximity to the PET surfaces and or inner amorphous regions. The embedding of the organic acids into the PET fibers during the textile dying process prevents the reductive clearing step from harming the organic acids and the textile materials still demonstrate efficacy following laundering (see FIG. 4).

The composition of the present invention may be in the physical form of a liquid concentrate. The acid(s) must first be dispersed in a concentrate form and then can be let-down to allow for practical application. A textile exhaustion process typically requires the use of water as the vehicle to carry the dyes and any additives for the treatment of fabrics.

In an embodiment of the invention, the composition of the present invention, preferably in a form of a polymeric concentrate such as a polymeric binding for coatings, comprises benzoic acid, sorbic acid, or a combination thereof. In a polymeric binder, a concentration ranging from 0.1% to 40% based on solution % solids is needed. If more than one acid is used in combination then the total weight of the active acids is between 5% to 60% by weight of the final composition, preferably 5% to 40% by weight of the final composition. The treatment composition is added as a concentrate into an exhaust or pad bath to allow a final concentration of 0.1% to 5% active on weight of fabric. For example, the essential oil, if present, may be at a final concentration of 0.05 weight % to 1 weight % by weight of fabric and odor mitigation compounds, if present, may be at a final concentration of 0.05 weight % to 1 weight % by weight of fabric.

An inorganic polymer rheology modifier may be used with the concentrate of the present invention to prevent or reduce any negative effect on some dyes used in the textile exhaustion process due to the presence of an organic acid. Organic acids such as benzoic acid or sorbic acid may change the tone of dyes. An observed change in color tone is not typically desirable as textile mills do not have the ability to adjust the dye blends once the exhaustion process has been begun. Unexpectedly, an inorganic polymer rheology modifier, in addition to moderating the rheological properties of the concentrate, helps to preserve and stabilize the dye colors. The inorganic additive provides an orientation matrix with the non-ionic dispersant, the organic acid, and the water molecules to provide an environment that is not as harsh to the dyes in the exhaustion process.

The application method is used for treatment of textile materials, including synthetic and naturally derived fibers.

Figure 2:
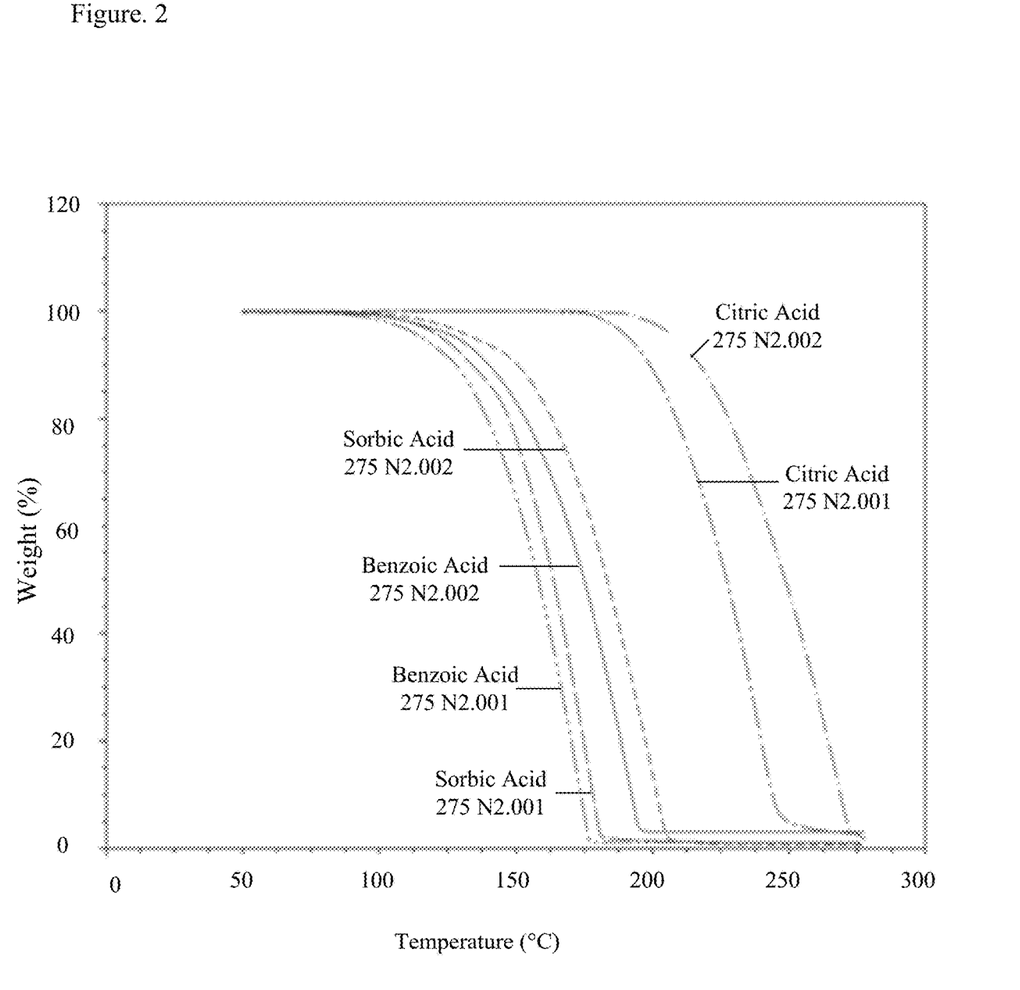
FIG. 2 is a TGA graph illustrating weight loss by percent versus temperature for each of benzoic acid, sorbic acid, and citric acid as measured at 10° C./s (0.001 samples) and 30° C./s (0.002 samples) temperature sweeps, providing an indication of the thermal stability of the samples and at what temperature the samples degrade.

The textile composition of the present invention is non-hazardous at end use levels, applicable to most forms of textile manufacturing, stable to laundering, and does not impact the textile properties. The selected GRAS acids are thermally stable at relevant processing temperatures as shown by the thermo-gravimetric data displayed in FIG. 2.

After the dye exhaustion process, a textile fabric may be exposed to NaOH and/or a reducing agent such as sodium hydrosulfite to remove any unreacted dyes from the textile in a process known as a "reductive clear." Since benzoic acid and sorbic acid could theoretically be removed during the reductive clearing process, textiles with either chemistry were evaluated following reductive clearing to ensure survival in an industrial process.

During the textile treatment and dying process, the active ingredients of the invention become part of the fibers of the fabric where they cannot be washed away by numerous launderings. The use of surfactants, wicking agents, leveling agents, softeners, and binders ensure the proper distribution of the active ingredients and their molecular orientation during the exhaustion process. Emulsion surfactants aid in the micellular formation incorporating the active ingredients. Wicking agents are used to improve the interface of polar and non-polar surfaces during exhaustion. Leveling agents are added to ensure a uniform distribution of the dye on the fabric. Textile binders used in the dye exhaustion process remain on the fabric and contribute to active ingredient durability. Textile softeners are incorporated to allow for a softer feel to the fabric when a binder has been used. The disperse dye chemistry and the surfactants used in addition allow the formation micelles which carry the dye molecules into the PET fibers at the correct operation temperatures. Once the micelle is within appropriate proximity to the PET structures, van der Waals forces take over and the dye molecules adhere to the inner amorphous regions of the PET fibers. The micelle surfactant molecules then attract to a different unbound dye molecule and the process starts over again. The indication is that the organic acids undergo dissociation as well leading to the negatively charged ionic acids becoming attracted to the hydrophilic heads of the micelles and finding that pathway into close proximity to the PET surfaces and or inner amorphous regions. The embedding of the organic acids into the PET fibers during the textile dying process prevents the organic acids from being washed away in repeated launderings giving durability to the antimicrobial benefit.

In an embodiment of the invention, an article such as a textile material is treated with the composition of the present invention is provided. It is contemplated and within the scope of the present invention that other materials and objects may be treated with the composition of the present invention.

Comparative Example

Figure 1:
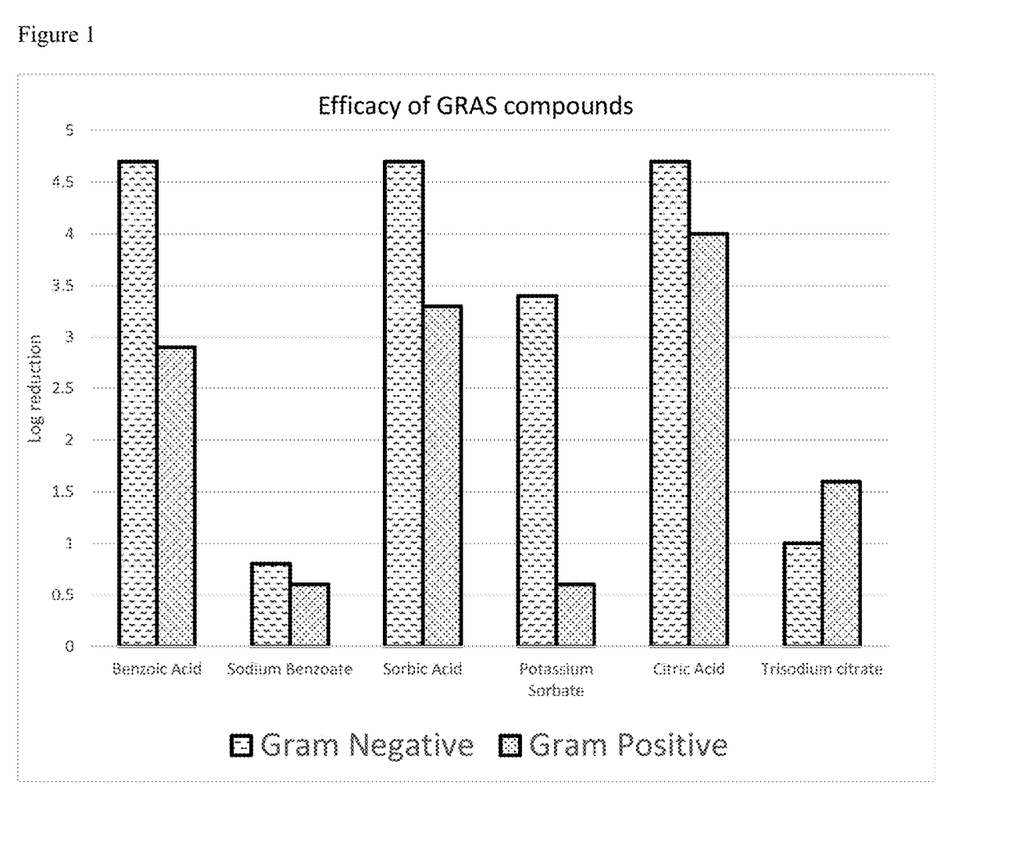
FIG. 1 is a graph illustrating the efficacy of "Generally Recognized As Safe" (GRAS) compounds with zero home launderings (HL) using an AATCC TM100 protocol.

As illustrated in FIG. 1, using only the salts (sodium benzoate, potassium sorbate, and trisodium citrate) of each of benzoic acid, sorbic acid, and citric acid resulted in relatively low levels of efficacy. Additionally, the use of the salts to treat the garment surface resulted in the textile being stiff to the touch following application. These two characteristics of garments treated with salts, along with the good water solubility of the salts which will reduce durability to laundering, make these not suitable for textile use. Note that no attempts to lower the liquor pH to convert the salts to acids were made in this case.

Example 1

Figure 3:
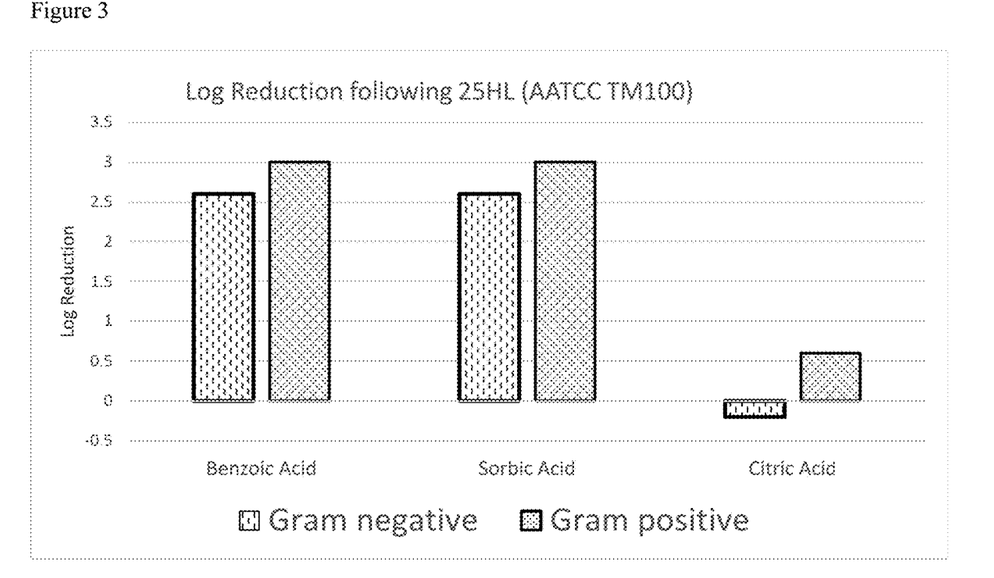
FIG. 3 is a graph illustrating efficacy results after 25 home launderings (HL).

As illustrated in FIG. 3, following washing regimens by the industry recognized method AATCC 38, each of benzoic acid and sorbic acid were able to maintain efficacy following multiple washing cycles. This is a typical requirement within the textile industry. Citric acid alone was not able to maintain efficacy following the same washing regimen, as with the benzoic and sorbic acid treatments.

Example 2

An experiment was run to demonstrate the fungal resistance of a textile sample treated with 0.4% of cinnamon oil. Following day 4 of exposure to an *Aspergillus niger* culture, as per industry method AATCC 30(III), the addition of essential oils to either benzoic or sorbic acid resulted in a visible zone of no growth around the treated samples. This unique combination allowed for both antibacterial and antifungal activity of a treated textile material.

Example 3

Using the same percentages of three dyes, a blue, a red, and a yellow, each used in combination for each of three polyethylene terephthalate fabric samples, a textile dye exhaustion experiment was carried out. The first fabric sample (A) was exhausted with the dyes only. The second fabric sample (B) was exhausted with the dyes and the active concentrate, formulated with an inorganic polymer rheology modifier, to where the amount of organic acid present equaled 0.5% of the weight of the exhaustion bath. The third fabric sample (C) was exhausted with the dyes and 0.5% of the organic acid by weight of the exhaustion bath, but without the full formulation of the concentrate. The liquor ratio of the bath was 10:1.

The results showed that the color tone of sample (A) was much more like the color tone of the second sample (B), and sample (C) was noticeably a different tone. The formulated concentrate was more effective at matching the colors than the organic acid alone.

A 0.5% owb treat rate of benzoic acid was used to make the color comparison. A is an untreated control with no benzoic acid, B is treated with 0.5% owb benzoic acid in its formulated concentrate product, and C is treated with 0.5% owb of benzoic acid without the formulated concentrate.

Example 4

High dye load samples are the most difficult to process using exhaustion dye techniques. A series of tests were run using PET (polyester) and polyspandex fabrics. In this test series the materials were tested in two different laboratories using container-style lab exhaust equipment. Alongside the treated samples, untreated fabrics were run for comparison. The exhaustion process used the following parameters:

10:1 Liquor Ratio
12.5 g/L Benzoic Acid dispersion, 40% Benzoic Acid
Exhaust cycle of 40 minutes at 130° C.
5% Acid Disperse Dye—Black
Reductive clear—0.3% NaOH & 0.4% Na hydrosulfite for 20 minutes at 85° C.
Dried at 130° C. for 120 s The samples were tested for efficacy using the AATCC TM100-2019. Kp only was run as an indicator organism, as it was found that any sample that was efficacious against Kp was also efficacious against Sa.

TABLE 1

|  | PET Fabric A | | PET Fabric B | |
|---|---|---|---|---|
|  | 0 HL | 25 HL | 0 HL | 25 HL |
| Location A Result | 99.21% | 99.80% | 98.74% | 99.97% |
| Location B Result | 99.84% | 99.68% | 99.50% | 97.49% |

Table 1—Percent reduction of treated samples, two different locations, two different suppliers of polyester fabric. The fabrics were tested as-made and after 25 home launderings (25 HL). Each home laundering was performed in a commercial front-load washing machine per AATCC Monograph M6 using Tide HE detergent.

The results in Table 1 show average bacterial reductions of >90% in all case and <99% in most cases. Each number is made up of 24 tested samples produced using two black dyes from different suppliers, with and without dye levelers—no significant difference in efficacy was noticed between the groups. Excellent wash durability is demonstrated by this technology.

Polyspandex was run as well as PET, in a manner identical to the above. For this material, which is similar to PET but with an additional elastomer component (90% PET, 10% Spandex), the following results were generated:

TABLE 2

|  | Polyspandex Fabric | |
|---|---|---|
|  | 0 HL | 25 HL |
| Location A Result | 98.42% | >99.99% |
| Location B Result | >99.99% | 92.06% |

In addition to efficacy testing, dye color and fastness was tested on these samples as the quality of the dye color must not be affected by the antimicrobial treatment. The following standard textile quality control tests were performed on samples from the two test sets above, along with untreated samples that were produced alongside the treated samples in an identical fashion:

TABLE 3

| Crock and colorfastness results for the Polyester materials | | |
|---|---|---|
| POLYESTER FABRIC | TREATED | UNTREATED |
| Color Fastness | 3-4 | 3 |
| Dry crocking | 3 | 3 |
| Wet crocking | 4-5 | 4-5 |
| Wicking- 0 HL | 2 s | 4 s |
| CMC AE | 0.59 | — |

TABLE 4

| POLYSPANDEX | TREATED | UNTREATED |
|---|---|---|
| Color Fastness | 3-4 | 3-4 |
| Dry crocking | 3-4 | 3-4 |
| Wet crocking | 4 | 4-5 |

TABLE 4-continued

| POLYSPANDEX | TREATED | UNTREATED |
|---|---|---|
| Wicking- 0 HL | 1 s | 1 s |
| CMC AE | 0.71 | — |

It can be seen from these results that the dye fastness and color matches the untreated fabric, giving the conclusion that the proposed antimicrobial treatment does not affect the dye fastness or color.

Example 5

Trials have been performed in a small Thiele exhaustion pilot unit, as well as in Mathis JFO pilot scale equipment, both of which use jets to forcibly impregnate the textile with the exhaust liquor. As the data in the table below demonstrates, this invention has been used in the industrially relevant jet-exhaust processes with excellent results.

Table 5 sets forth results from various runs to demonstrate the process in jetted exhaust equipment. The runs demonstrate also compatibility with different dye levels, leveling chemistries, reductive clears and drying temperatures. Reductive Clears—Method A is 1% Na Hydrosulfite whereas Method B is 0.3% NaOH, 0.4% Na Hydrosulfite. "owg" is "on weight of goods".

converted into benzoic acid. Using a water-soluble salt and adding acidifying the liquor to a pH of 3.6 or less is a convenient way to incorporate this invention into an exhaust liquor and to allow aqueous formulations without having to develop a dispersion. The results in Table 6 are an example indicating that using sodium benzoate and acidifying the liquor bath is equivalent to treating with benzoic acid.

Table 6—Polyester Fabric run as Example 4 above except that sodium benzoate acidified with citric acid to pH<3.6 was used instead of benzoic acid to confer the antimicrobial benefit. No visible difference between treated and untreated dyed fabric samples was observed.

TABLE 6

| | Polyester Fabric | |
|---|---|---|
| | 0 HL | 25 HL |
| Mathis JFO Exhaust | 99.50% | 99.50% |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reason-

TABLE 5

| | Thies Run 7-1, 7-2 | | | | Mathis JFO | |
|---|---|---|---|---|---|---|
| | Run #1 | | Run #2 | | Run #3 | |
| Exhaustion Bath Formula | %, ratio | | %, ratio | | %, ratio | |
| Fabric | 1:10 bath | 21.8 kg | 1:10 bath | 21.8 kg | 1:10 bath | 800 g |
| Foron Black RD-RM 400 | 0.5% owg | | 0.5% owg | | 5% owg | |
| Benzoic Acid Slurry (40% active) | 12.5 g/L | | 12.5 g/L | | 12.5 g/L | |
| Defoamer: Fumexol 100 | 1 g/L | | 1 g/L | | 1 g/L | |
| Anionic Leveler | 0.25% owg | | | | | |
| Nonionic Leveler | | | 0.25% owg | | | |
| Reductive Clear | Method A System | 90° C., 10 min | Method A System | 90° C., 10 min | Method B System | 90° C., 10 min |
| Tap water (L) | | 220 L | | 250 L | | 8 L |
| Acid neutralization | | | | | Acetic acid | 75° C., 10 min. |
| Drying Temperature | 150° C. | 90 s | 150° C. | 90 s | 130° C. | 120 s |
| AATCC TM-100 | Kp | Sa | Kp | Sa | Kp | Sa |
| 0 HL | 98.74% | 99.00% | 97.49% | 99.65% | 99.97% | N/A |
| 25 HL | 99.98% | 99.00% | <99.99% | 99.37% | 98.74% | N/A |

Example 6

One possibility of introducing an organic acid, such as benzoic acid, into an aqueous system such as an exhaust liquor is through adding the salt of the organic acid and then lowering the pH of the system below the pKa value. Typically acetic acid or citric acid are used in textile mills to control liquor pH. A salt of benzoic acid is sodium benzoate, and the pKa value for this system is 4.2. According to the Henderson-Hasselbalch equation if the pH is lowered to ~3.6, 80% of the Na benzoate added to a system will be ably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any

What is claimed is:

1. A method for prolonged odor reduction and bacterial control on and within a treated textile material, the method comprising:
    (a) providing a bath liquor,
    (b) adding a sodium benzoate salt to the bath liquor at a concentration of 5% to 60% by weight of the bath liquor,
    (c) lowering pH of the bath liquor to a pH of 3.6 or less thereby converting the sodium benzoate salt to benzoic acid in a resulting treatment bath liquor, and
    (d) applying, by a padding or exhaustion method at a temperature ranging from 120° C. to 150° C., the treatment bath liquor of step (c) to a textile material thereby introducing and embedding the benzoic acid into inner amorphous regions of the textile material thereby forming a treated textile material having the benzoic acid on and within the treated textile material that exhibits prolonged odor reduction and bacterial control.

2. The method of claim 1, wherein the textile material includes a colored dye and the bath liquor of any of steps (a)-(c) further comprises a dye and an inorganic polymer rheology modifier, and wherein, after step (d), the colored dye in the treated textile material remains visually unchanged.

3. The method of claim 1, wherein the bath liquor of step (a) further comprises an essential oil at a concentration of 1% to 20% by weight of the bath liquor.

4. The method of claim 1, wherein the treated textile material has an applied final concentration of 0.1% to 5% active on weight of the treated textile material.

5. The method of claim 1, wherein the textile material is polyethylene terephthalate fabric.

6. The method of claim 3, wherein the essential oil is selected from the group consisting of cedarwood oil, *eucalyptus* oil (*Eucalyptus globulus* or *E. radiata*), clove oil (*Eugenia caryophyllata*), oregano oil (*Origanum vulgare*), thyme oil (*Thymus vulgaris*), cinnamon bark oil (*Cinnamomum zeylanicum*), peppermint oil (*Mentha piperita*), basil oil (*Ocimum basilicum*), rosemary oil (*Salvia rosmarinus*), perilla oil (*Perilla frutescens*), citron oil (*Citrus medica*), and a combination thereof.

7. The method of claim 1, wherein treated textile further comprises an odor mitigation compound is selected from the group consisting of a metal oxide, activated carbon, sodium carbonate, calcium carbonate, zinc rincoleate, and a combination thereof.

8. The method of claim 7, wherein the odor mitigation compound is present in a range of 0.05 weight % to 1.0 weight % by weight of fabric.

9. A treated textile material having prolonged odor reduction and bacterial control made from the method of claim 1.

10. The method of claim 1, wherein the textile material is polyethylene terephthalate fabric and the treated textile material has an applied final concentration of 0.1% to 5% active on weight of the treated textile material.

11. The method of claim 10, wherein the essential oil is selected from the group consisting of cedarwood oil, *eucalyptus* oil (*Eucalyptus globulus* or *E. radiata*), clove oil (*Eugenia caryophyllata*), oregano oil (*Origanum vulgare*), thyme oil (*Thymus vulgaris*), cinnamon bark oil (*Cinnamomum zeylanicum*), peppermint oil (*Mentha piperita*), basil oil (*Ocimum basilicum*), rosemary oil (*Salvia rosmarinus*), perilla oil (*Perilla frutescens*), citron oil (*Citrus medica*), and a combination thereof.

12. The method of claim 10, wherein treated textile further comprises an odor mitigation compound is selected from the group consisting of a metal oxide, activated carbon, sodium carbonate, calcium carbonate, zinc rincoleate, and a combination thereof.

13. The method of claim 12, wherein the odor mitigation compound is present in a range of 0.05 weight % to 1.0 weight % by weight of fabric.

* * * * *